FIRING PIN

BACKGROUND OF THE INVENTION

Firearms are provided with a firing pin having an anvil end struck by the firearm hammer upon pulling of the trigger, when the firearm is fired. The other end of the firing pin is adapted to strike the rear of the cartridge, either at its center or proximate its edge, for firing the explosive charge in the cartridge and projecting the bullet through the firearm barrel. The firing pin has a shoulder abutment, proximate the anvil end, which limits the amount of forward motion of the firing pin upon striking of the anvil by the hammer.

In firearms designed for use with center-fire ammunition, the firing pin is in the form of a slender steel rod slidably disposed in a longitudinal bore formed in the firearm bolt. The firearm bolt is disposed in a longitudinal bore in a bolt-carrier and, generally, the assembly formed by the firing pin, the bolt and the bolt carrier is reciprocable relative to a stationary member of the firearm such as the receiver. In automatic firearms, or semi-automatic, reciprocation of the bolt and bolt-carrier in the receiver away from the firearm chamber accomplishes the functions of unlocking the bolt locking lugs from the barrel extension lugs, displacing the bolt and bolt-carrier rearwardly, and returning the hammer to the cocked position, while simultaneously extracting the cartridge of the spent round of ammunition from the chamber and ejecting the cartridge through an ejection port. The return of the bolt and bolt-carrier by the action of a return spring causes feeding of a fresh cartridge from the clip or magazine into the chamber. At the end of the stroke of the bolt-carrier, a pin and cam arrangement causes the bolt, after introducing its lugs through the lugs of the barrel extension, to rotate and lock the bolt in position, thus closing the chamber.

In gas-operated firearms, the rearward motion of the bolt-carrier in the receiver is effected by a mechanism actuated by the expansion of the gas propelling the bullet through the barrel, bypassed through a gas port disposed through the sidewall of the barrel. Some firearms are designed to permit this bled gas to expand in a cylinder between the bolt and the bolt-carrier, driving the bolt-carrier to the rear, unlocking the bolt, and causing the bolt and bolt-carrier to be propelled in a rearward direction, returning the hammer to the cocked position and compressing the bolt-carrier return spring. The compressed spring, when expanding, returns the bolt-carrier towards the chamber, picking up a fresh cartridge and locking the bolt in position in the chamber, as previously explained.

In such gas-operated firearms, considerable leakage of gas occurs between the peripheral surface of the bolt and the inner wall surface of the bolt-carrier where the rear extension of the bolt projects through the end of the bolt-carrier. The stream of leaking gas bathes the firing pin shoulder abutment and the peripheral surface of the firing pin stem between the shoulder abutment and the rear extension of the bolt. Carbon and other dirt particles are progressively deposited as a strongly adhering coating on the exposed surfaces of the firing pin, and more particularly on the peripheral surface of the stem proximate the shoulder abutment, on the lateral surface of the shoulder abutment directed toward the bolt rear extension and at the junction between the peripheral surface of the stem and the shoulder abutment lateral surface. Such carbon, and other residue, deposits may build up to the point that the firing pin becomes literally jammed or frozen in the end of the bolt bore, and/or to the point that the deposit on the lateral surface of the shoulder abutment becomes thick enough to prevent adequate stroke of the firing pin, upon hitting of its anvil end by the hammer, or sufficient force to be transmitted by the hammer to the firing pin, thus causing misfiring of the cartridge in the chamber.

The present invention provides a particular structure for firearm firing pins which remedies the inconveniences of the prior art, the particular firing pin structure of the invention preventing the accumulation of carbon or other dirt particles on the peripheral surface of the firing pin stem and shoulder abutment.

SUMMARY

The present invention accomplishes its purposes by providing a firing pin having apertures, in the form of slots or small bores through the shoulder abutment, defining an escape path for gas and dirt particles. By making such slots or small bores at an angle to the longitudinal axis of the firing pin in firearms wherein the bolt-carrier and bolt are operated by gas pressure, the action of the escaping gas flowing through the inclined slots or bores rotates the firing pin, thus tending to scrub away any film or particles deposits on the critical surfaces of the firing pin and shoulder abutment. The invention also contemplates cutting generally longitudinal grooves on the peripheral surfaces of the firing pin stem proximate the shoulder abutment, the edge of such grooves having a scrubbing action, more particularly in relation with the end of the bolt bore accepting the firing pin, such as to keep the surface in engagement with the grooves in a relatively clean state.

Although the present invention has particular advantages in gas-operated automatic and semi-automatic firearms, the principle of the invention can be adapted to firearms in which the bolt and/or bolt-carrier are manually operated, as it permits easy lubrication of the firing pin surface and prevents the deposit of dirt on the firing pin peripheral surface and on the surface of the wall of the cavity or bore accepting the firing pin.

The diverse objects and advantages of the present invention will become apparent to those skilled in the art when the following description of the best modes contemplated for practicing the invention is read in conjunction with the accompanying drawing wherein like reference numerals relate to like or equivalent parts and in which:

BRIEF DESCRIPTION OF THE DRAWING

FIG. 1 is a schematic illustration, generally in longitudinal section, of a gas-operated bolt and bolt-carrier for a firearm, showing the bolt in closed locked position;

FIG. 2 is a view similar to FIG. 1 but showing the bolt in an unlocked position;

FIG. 3 and 3a are, respectively, a longitudinal elevation view and a transverse section along line 3a—3a of FIG. 3, of the conventional prior art firing pin incorporated in the structure of FIGS. 1-2;

FIGS. 4-11 are longitudinal view and partial views of alternate modifications of firing pins according to the present invention; and FIGS. 4a-11a are transverse sections thereof, respectively along line 4a—4a of FIG. 4, line 5a—5a of FIG. 5, line 6a—6a of FIG. 6, line 7a—7a of FIG. 7, line 8a—

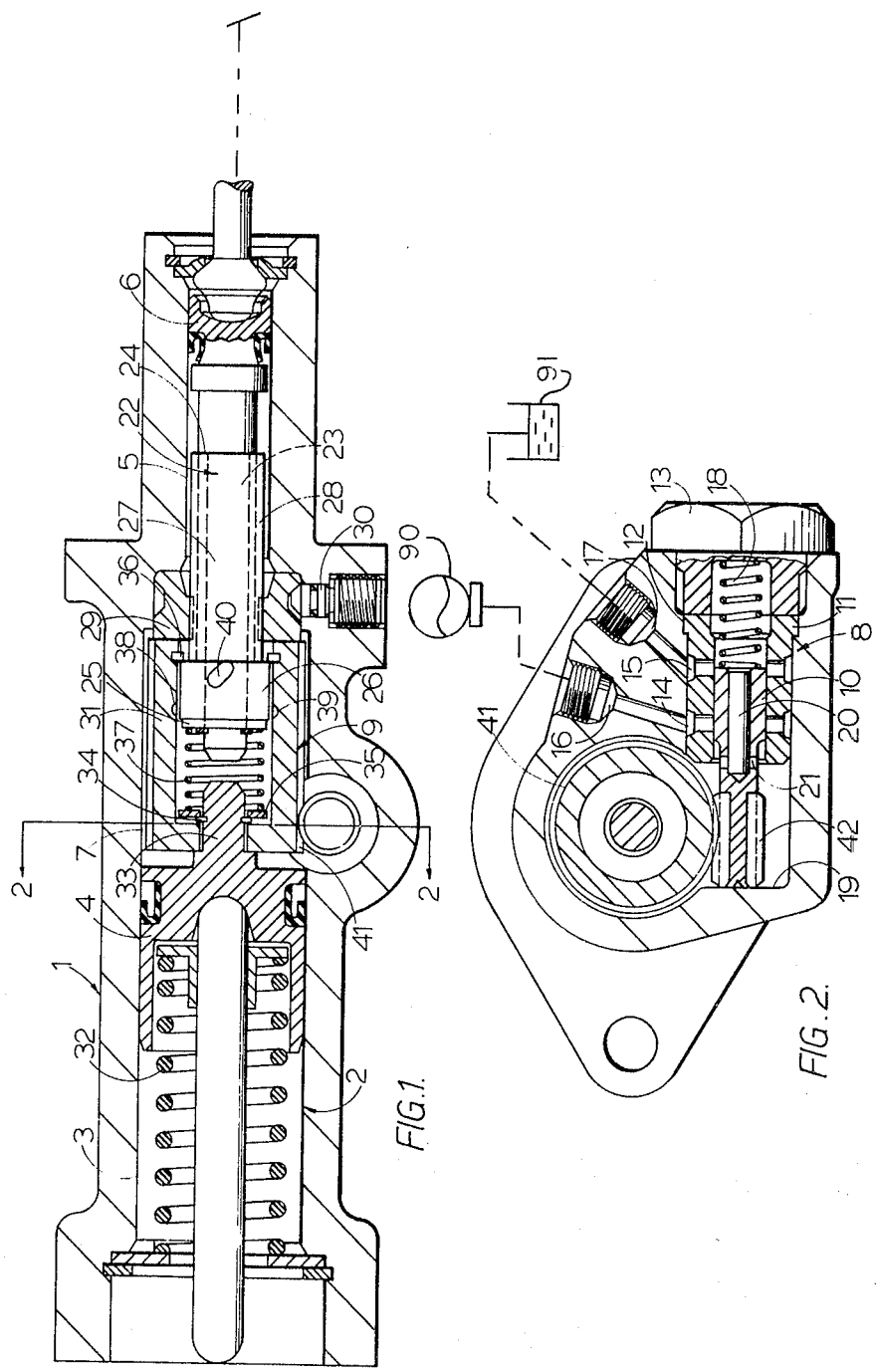

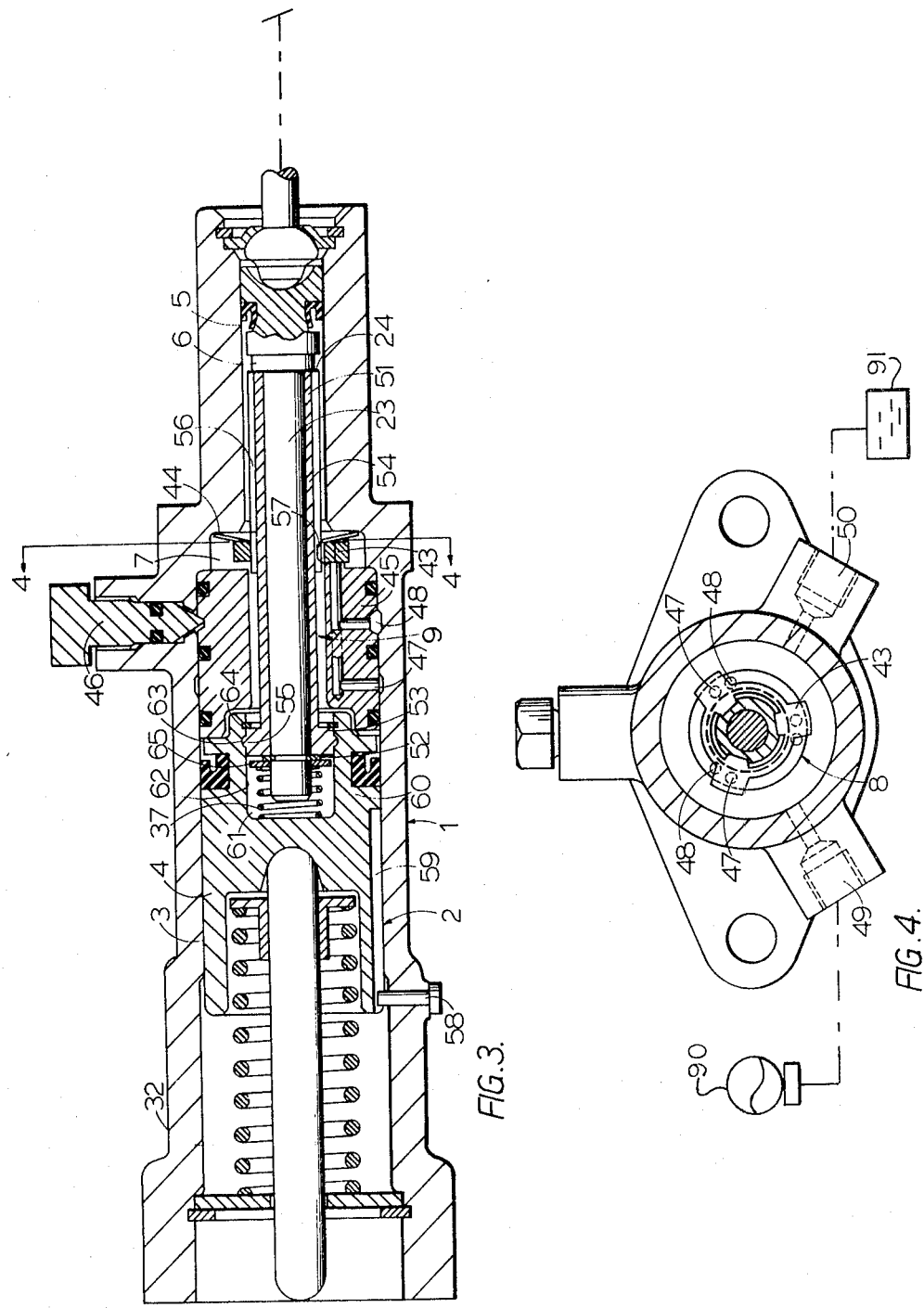

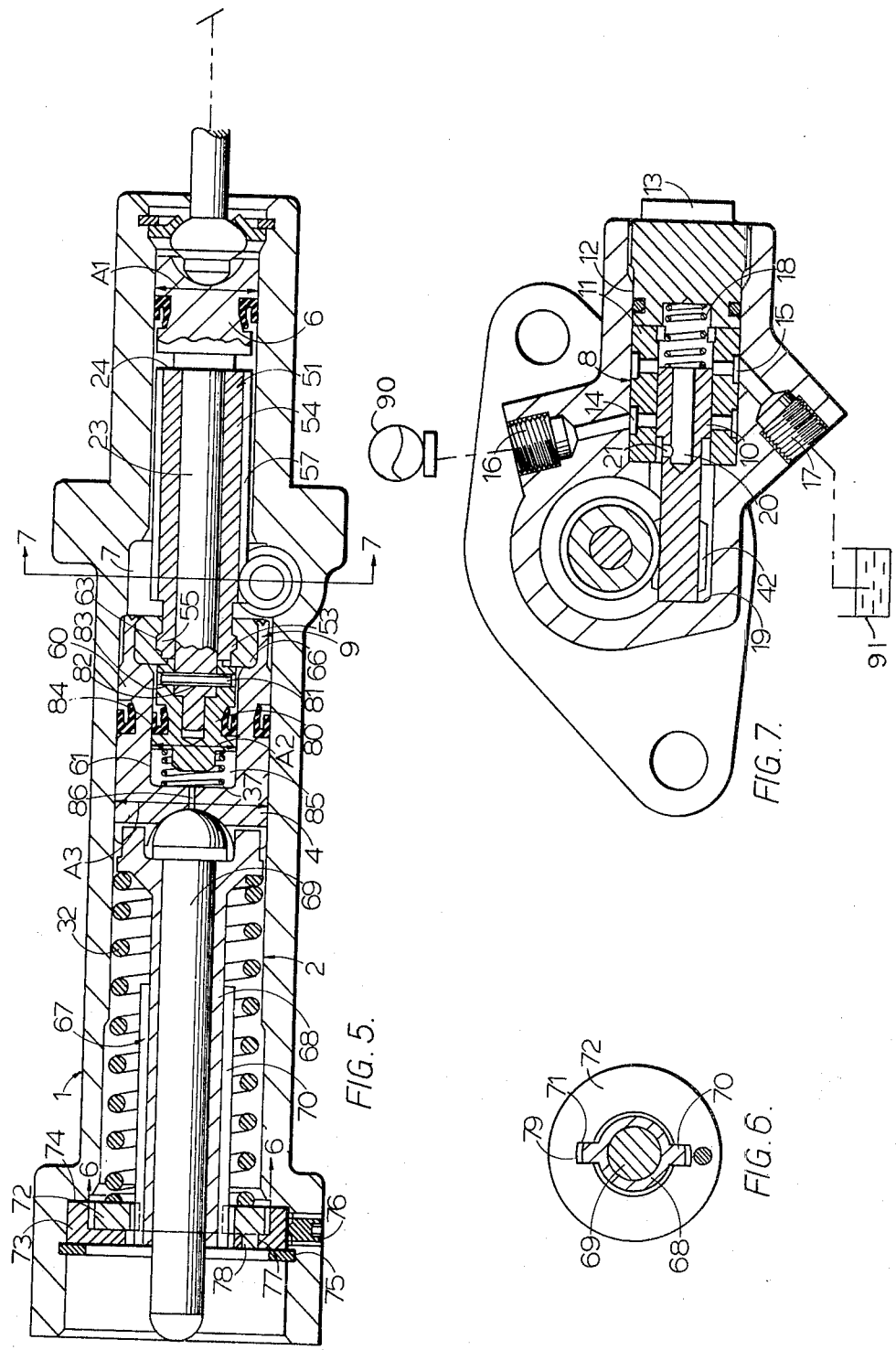

FLUID-PRESSURE OPERATED SERVO-MOTOR ASSEMBLIES

SPECIFIC DESCRIPTION

This invention relates to fluid-pressure operated servo-motor assemblies for vehicle braking systems of the kind in which an effort from pedal-operated input member is transmitted to an output member through a movable wall in a housing and, when the servo-motor is operated, the effort is augmented by a fluid-operating pressure applied to the movable wall and controlled by valve means responsive to relative movement between parts of the assembly.

In U.S. patent application Ser. No. 005787, filed Jan. 23, 1979 and assigned to the same assignee as the present application, there is have described a servo-motor of the kind set forth in which the valve means is located in a stationary part of the housing and is operated by an operating assembly located within the housing between the input and the output members. The operating assembly includes a rotary actuating member and a non-rotatable reaction member. The actuating member is angularly movable to operate the valve means in response to relative axial movement in a direction towards the non-rotatable reaction member. Balls are arranged between corresponding pairs of ramps constituted by the sides of complementary recesses in the adjacent faces of the two members so that, as the actuating member moves towards the reaction member, the balls are forced down the ramps and into the recesses simultaneously, causing angular movement of the actuating member.

This prior construction, besides being relatively complex to manufacture and assemble, relies upon the force in a return spring, which is substantial, for moving the actuating member angularly in the opposite direction to return the valve means to an off position when the effort applied to the input member is relieved. Thus, no positive force under the control of the pedal is applied to the valve means to move it into the off position.

According to our present invention in a fluid-pressure operated servo-motor assembly of the kind set forth the valve means is located in a stationary part of the housing and is operated by an operating assembly located within the housing between the input and the output members, the operating assembly comprising a rotatable actuating member for operating the valve means, a non-rotatable operating member, and a helical engagement between parts of the actuating member and the operating member constructed and arranged such that relative movement between the actuating member and the operating member in an axial direction in response to the effort causes rotation of the actuating member to operate the valve means so that fluid pressure can be admitted to a boost chamber for application to the movable wall.

Conveniently the operating member moves relatively towards the actuating member to operate the valve means and, when the effort applied to the input member from the pedal is relieved, the actuating member and the operating member move relatively away from each other to return the valve means to its initial position by rotation of the actuating member in the opposite direction.

Pressurisation of the boost chamber to augment the effort causes the output member to operate an hydraulic master cylinder for applying wheel brakes, and the boost pressure is also transmitted to the input member to provide a reaction or "feel" at the pedal. This force is preferably not transmitted through the operating assembly.

Preferably a return spring is incorporated to cause the two members to move away from each other when the effort is relieved. The boost pressure and the return spring are operative to take up any backlash in the helical engagement, and should the valve means stick during the movement of the members away from each other, after any backlash has been taken up in the helical engagement, the helical engagement itself is operative to ensure the valve means is positively returned to its initial position.

Conveniently the input and output members comprise pistons working in a bore in the housing, with the boost chamber being defined in a space in the bore between the two pistons, and the operating assembly being located in the boost chamber.

The operating assembly is relatively simple to manufacture, assemble and maintain. In one embodiment the actuating member is of cup-shaped outline coupled at its closed end to the output member in a manner allowing relative rotation, with the operating member movable axially with the input member and projecting into the actuating member through its open end.

In a modification the output member is movable axially and keyed against rotation, and is provided with the operating member, while the actuating member comprises a rotatable sleeve mounted on the input member. The operating member may be integral with the output member.

In all the constructions the helical engagement comprises at least one helical groove in one of the members with the other member provided with a radial projection which is received in the groove. The helical groove is in the form of a thread having two starts with the grooves displaced from each by 180°, and with one projection received in each groove. This provides a balanced construction.

The thread may be of the type known as a "fast" thread in which the tangent of the helix angle exceeds the coefficient of friction between the members so that an axial force causes rotation or angular movement of the actuating member.

The actuating member may have a splined engagement with the valve means, the engagement being so constructed and arranged that angular movement of the actuating member causes the valve means to be operated, but axial movement of the actuating member has no effect on the valve means.

The valve means may comprise a spool valve working in a transverse bore in the housing, or a rotary face valve located in the bore.

A further modification is designed to operate at higher pressures of up to 100 bars instead of 70 bars, which can have the advantage of weight-reduction of the assembly. For high pressure operation the input member needs to have its effective diameter reduced in order to avoid any increase in the reaction force on the input member. However, an input rod, which transmits the effort from the pedal to the input member cannot be reduced in size due to the risk of mechanical failure in the event of failure of the boost pressure.

Thus in our invention a chamber defined between the input and output members and sealed from the boost chamber is vented to atmosphere, the arrangement being such that the effective diameter of the input member is reduced.

Further, according to our invention, in a fluid-pressure operated servo-motor assembly, in which an effort is transmitted from a pedal-operated input member to an output member in axial alignment with the input member through a movable wall in a housing, and a boost chamber is defined between the input and output members to which pressure fluid is admitted for application to the movable wall to augment the effort, a chamber sealed from the boost chamber is defined between the members, the chamber having a cross-sectional area less than that of the input member and being vented to a pressure substantially less than the fluid operating pressure.

Some embodiments of our invention are illustrated in the accompanying drawings in which:

FIG. 1 is a longitudinal section through a servo-motor assembly for a vehicle braking system;

FIG. 2 is a section along the line 2—2 of FIG. 1;

FIG. 3 is a longitudinal section through a modified servo-motor assembly;

FIG. 4 is a section along the line 4—4 of FIG. 3;

FIG. 5 is a longitudinal section through a further modified servo-motor;

FIG. 6 is a section along the line 6—6 of FIG. 5; and

FIG. 7 is a section along the line 7—7 of FIG. 5.

The servo-motor assembly illustrated in FIGS. 1 and 2 of the drawings comprises a housing 1 provided with a stepped longitudinal bore 2 having a bore portion 3 of greater diameter in which works an output piston 4 and a bore portion 5 of smaller diameter in which works a pedal-operated input piston 6.

A space in the bore between the two pistons 4 and 6 defines a boost chamber 7 into which hydraulic fluid under pressure is admitted from a source 90 of pressure fluid under the control of valve means 8 which is operated by an operating assembly 9 disposed between the pistons 4 and 6.

The valve means 8 comprises a spool 10 which slides in a sleeve 11 lining a bore 12 in the housing 1 which is transverse to the bore 2. The sleeve 11 is retained in position by a bolt 13 which closes the outer end of the bore 12. The spool 10 controls communication between radial ports 14 and 15 in the sleeve 11 which are in communication respectively with passages 16 and 17 in the housing. The passage 16 is connected to a source 90 of high pressure fluid, for example an hydraulic accumulator, and the passage 17 to a reservoir 91 for hydraulic fluid. In the inoperative position shown in which the valve means 8 is closed, the spool 10 is urged by a spring 18 against a stop face 19 at the inner end of the bore 12, the port 14 is closed, and the port 15 communicates with the boost chamber 7 through communicating axial and radial passages 20 and 21 in the spool 10.

The operating assembly 9 comprises an operating member and an actuating member. The operating member comprises a sleeve 22 which receives an extension 23 of reduced diameter of the forward end of the input piston 6. The sleeve 22 is mounted on the extension 23 against relative axial movement by a shoulder 24 at the step in diameter between the piston 6 and the extension 23 acting on the opposite end through an abutment plate 25. The sleeve 22 comprises an enlarged cylindrical head 26 which engages with the plate 25 and which is carried by a stem 27. The stem 27 has a plurality of angularly spaced slots 28 which are slidably guided through a complementary shaped aperture in a guide plate 29 and a radial plug 30 holds the plate 29 against rotation with respect to the housing so that the operating member 22 is also held against rotation.

The actuating member comprises a cylindrical component 31 of cup-shaped outline which abuts at its inner open end against the plate 29 in response to the force in a return spring 32 for the output piston 4. An extension 33 of reduced diameter on the piston 4 extends through the closed end of the component 31 and carries a circlip 34 which forms an abutment for a slidable abutment plate 35. The head 26 is retained within the component 31 by means of a circlip 36 and the outer end of the head 26 is urged into engagement with the circlip by means of compression spring 37 acting between the abutment plates 35 and 25. The inner surface of the component 31 is provided with a two-start thread comprising helical grooves 38 and 39 in which diametrically opposed radial projections 40 on the head 26 are slidably received. The outer face of the component 31 is provided with a plurality of angularly spaced straight splines 41, preferably of involute form, which mesh with axially spaced circumferentially extending teeth 42 at the end of the spool 10 which is adjacent to the stop face 19. The engagement between the component 31 and the spool 10 is therefore similar or equivalent to that of a rack and pinion arrangement such that no motion is imparted to the spool 10 when the component 31 is moved axially with respect to the bore 2, but that the spool 10 is moved axially in the sleeve 11 in response to rotation of the component 31 with respect to the bore 2.

In the inoperative position shown in the drawings all the parts are fully retracted with the spool 10 held against the stop face 19 as described above. When the pedal is operated to advance the piston 6 in the bore portion 5, the operating member 22 is moved by the same amount, but only in an axial direction as it is keyed by the guide plate 29. Since the return spring 32 is stronger than the spring 37, the operating member 22 also moves axially with respect to the component 31 to take up the backlash in the helical engagement and then the engagement of the projections 40 in the grooves 38 and 39 causes the actuating member 31 to move angularly or rotate with respect to the bore 2. This movement causes the spool 10 to move towards the bolt 13, initially to close the port 15 and isolate the boost chamber 7 from the reservoir 91, and subsequently to open the port 14 so that pressure fluid is supplied to the boost chamber 7. The spring 18 is operative to take up any play between the splines 41 and the teeth 42.

Pressurisation of the boost chamber 7 causes the piston 4 to move against the force in the return spring 32 to operate an hydraulic master cylinder for applying wheel brakes, and the pressure also acts on the piston 6 to provide a reaction or "feel" at the pedal.

When the pressure in the boost chamber 7 acting on the input piston 6 equals the applied load the two pistons move slightly away from each other due to the effect of the boost pressure, and to a lesser extent the spring 37. This movement takes up the blacklash between the projection 40 and the grooves 38 and 39. The engagement of the projections 40 in the grooves 38 and 39 then causes the actuating member 31 also to rotate in the opposite direction to enable the spool 10 also to move in the opposite direction and close the port 14, in response to the loading in the spring 18. Should the spool 10 stick, so that the spring 18 cannot act to move the spool 10, the separation between the pistons first takes up the backlash between the projections 40 and the grooves 38 and 39 and, thereafter, further separation positively rotates the actuating member 31 to enable the spool 10 to close the port 14 as described above. The port 14 remains closed so that the servo-motor is held in a balanced or "null" position.

In the event of failure of the pressure source the master cylinder can be operated by the extension 23 engaging directly with the inner end of the output piston 4.

Since the brake applying forces are not transmitted through the operating assembly 9, the operating member 22 and the actuating member 31 can be constructed from plastics material, as can the guide plate 29. This facilitates construction and represents a considerable cost reduction. The rack portion of the spool 10 can also be of plastics material and be fixed to the spool 10 as a sub-assembly.

The embodiment of FIGS. 3 and 4 is a modification of that shown in FIGS. 1 and 2, and corresponding reference numerals have been applied to corresponding parts.

The housing 1 is again provided with a stepped bore 2, with the input piston 6 and the output piston 4 in the bore portions 5 and 3 respectively.

A boost chamber 7 is defined in the bore between the two pistons 4 and 6 into which hydraulic fluid under pressure is admitted under the control of valve means 8 operated by operating assembly 9.

The valve means 8 comprises a rotary face valve, which comprises a valve ring 43 loaded by spring 44 against the end face of a porting block 45. The block 45 is located in the bore portion 3 between the input piston 6 and the output piston 4, and is keyed against rotation by a radial plug 46 located in the housing 1. The block 45 carries three pairs of inlet and exhaust ports 47 and 48 which are connected to passages 49 and 50. The passage 49 is connected to a source 90 of high pressure fluid, and the passage 50 is connected to a reservoir 91. Communication of the boost chamber 7 to the reservoir 91 and pressure source 90 via the inlet and exhaust ports 47 and 48 is controlled by rotation of the valve ring 43. In the inoperative position shown the valve ring 43 closes the inlet ports 47, and the exhaust ports 48 are in communication with the boost chamber 7 and the reservoir 91.

The operating assembly 9 comprises an operating member and an actuating member. The actuating member comprises a sleeve 51 mounted on the extension 23 of reduced diameter at the forward end of the input piston 6.

The sleeve 51 is able to rotate on the extension 23, but is prevented from moving axially relative to the extension by a shoulder 24 at the step between the input piston 6 and the extension 23, and by a circlip 52 on the forward end of the extension. The sleeve 51 has an enlarged cylindrical head 53 which abuts the circlip 52 at its forward end, and a stem 54 carrying the head 53. The head 53 is formed with two diametrically opposed radial projections 55 which are adapted to engage with the operating member. The stem 54 is formed with a plurality of angularly spaced straight splines 56 which are adapted to engage with angularly spaced radially projecting teeth 57 on the valve ring 43. The arrangement is such that rotation of the sleeve 51 on the extension 23 in either direction will cause corresponding rotation of the valve ring 43, but the ring is unaffected by axial movement of the sleeve 51.

The operating member is provided on the output piston 4. The output piston 4 and hence the operating member is keyed against rotation by means of a radial peg 58 in the housing 1 working in an axial groove 59 in the output piston 4. The output piston 4 is provided with an integral annular portion 60 which extends towards the input piston 6 so that the forward end of the extension 23 and the head 53 of the sleeve 51 are received in a space 61 defined in the output piston 4. The inner surface 62 of the annular portion 60 is provided with a two-start thread comprising helical grooves 63 in which the projections 55 are slidably received to form the helical engagement between the operating and actuating members. The inner surface 62 is also provided with a circlip 64 against which the rearward face of the head 53 abuts in the inoperative position, providing a back stop for the actuating member.

A return spring 32 urges the output piston 4 against the block 45, and the head 53 of the sleeve 51 is urged against the circlip 64 by a compression spring 37 located in the space 61 and acting between the output piston 4 and a washer 65 provided on the extension 23, and in abutment with the circlip 52 on the side remote from the sleeve 51. The washer 65 and circlip 52 take the load of the spring 37, thus ensuring that the sleeve 51 can rotate freely.

Thus in the inoperative position shown in the drawings all the parts are in a retracted position, with the valve means in the position described above.

The operation of the servo-motor is similar to that described with reference to FIGS. 1 and 2, the difference being that the sleeve 51 as the actuating member moves both axially and angularly, with the angular movement causing rotation of the valve ring 43 to operate the valve means 8.

As the brake-applying forces are not transmitted through the operating assembly the sleeve 51 can conveniently be formed of plastics material. The input piston 6 may be constructed of metal or may be of plastics material with a central metal insert to enable the master cylinder to be operated in the event of failure of the pressure source.

FIGS. 5 to 7 show a further modified servo-motor assembly, which is adapted to work at higher pressures of up to 100 bars, instead of about 70 bars as in the previous embodiments.

The assembly of FIGS. 5 to 7 comprises a housing 1 provided with a stepped bore 2, an input piston 6 and an output piston 4 working in the bore 2, a space in the bore 2 between the pistons 4 and 6 defining a boost chamber 7, valve means 8 for controlling the supply of fluid into the boost chamber 7 and an operating assembly 9 which operates the valve means 8.

The valve means 8 comprises a spool valve similar in construction and operation to that shown in FIGS. 1 and 2, and corresponding reference numerals have been applied to corresponding parts.

The operating assembly is similar to that shown in FIGS. 3 and 4, and corresponding reference numerals have been applied to corresponding parts. Thus the actuating member comprises a rotatable sleeve 51 mounted on an extension 23 of the input piston 6. The sleeve 51 is provided with splines which co-operate with teeth 42 on the spool 10, such that axial movement of the sleeve 51 in the bore 2 imparts no motion to the spool 10, but angular movement of the sleeve causes the spool to move axially in its sleeve 11. The sleeve 51 is provided at its forward end with a head 53 on which are formed projections 55 for engagement with the operating member.

The operating member comprises a ring 66 provided with a two-start thread comprising helical grooves 63 in which the projections 55 are slidably received, and is non-rotatably attached to an annular extension 60 on the output piston 4. The output piston 4 is biassed towards the input piston 6 by a return spring 32, and is keyed against rotation in a manner which also accommodates lateral movement. This is achieved by an assembly 67 comprising a substantially cylindrical tube 68 which is non-rotatably attached to the output piston 4 on the side remote from the boost chamber 7, and which is mounted on a push rod 69 through which the output piston 4 acts to operate the master cylinder (not shown). The tube 68 is formed on its outer surface with two diametrically opposed straight axial splines 70. The splines 70 co-operate with axial slots 71 formed on the inner surface of a ring 72 mounted on the tube 68. The ring 72 is mounted in the bore by an annular plate 73 which is a close fit in the bore 2 and is fixed axially by engagement with a shoulder 74 at a step in the bore 2 at one side, and by a circlip 75 at the other side. A grub screw 76 located radially in the housing 1 prevents rotation of the plate 73. The plate 73 is also provided with a hole 77 in which an axially extending spigot 78 on the ring 72 engages to enable the ring 72 to pivot about the spigot 78, as permitted by a clearance 79 provided between the ring 72 and the tube 68. This movement accommodates lateral movement of the push rod 69 which may occur due to misalignment of the servo-motor assembly and the master cylinder.

The assembly is adapted for working at higher pressures by the provision of an additional piston 80 located in the space 61 in the output piston and mounted on the forward end of the extension 23 on the input piston 6. The additional piston 80 is fixed to the extension 23 by a pin 81 located in aligned transverse bores 82, 83 provided in the extension 23 and the additional piston 80 respectively. The additional piston 80 is urged into engagement with the operating member 66 by a spring 37 acting between the output piston 4 and the additional piston 80. A dynamic seal 84 is provided on the additional piston to define a chamber 85 between the additional piston and the output piston. The chamber 85 is vented to atmostphere via an axial passage 86 in the output piston 4. This means that the effective diameter of the input piston 6 is reduced from $A_1$ to $A_1-A_2$, where $A_2$ is the diameter of the additional piston 79, and that of the output piston 4 is reduced from $A_3$ to $A_3-A_2$.

The provision of the additional piston 80 also provides an extra bearing for the extension 23, thus preventing non-axial movement of the input piston, and providing the sleeve 51 with support which ensures more effective operation.

The provision of the extra dynamic seal 84 does not affect the operation of the assembly, as the relative movement of the input and output pistons is small enough to be accommodated by flexing, rather than sliding, of the seal 84. Thus the input force does not have to overcome any additional friction due to the seal 84 before the input piston moves, and the hysteresial behavior of the assembly is unaffected.

The operation of the assembly is the same as that of the first two embodiments, with the additional piston 80 moving with the input piston 6, and the assembly 67 being operative to permit non-axial movement of the push rod 69 in actuating the master cylinder.

In a modification, if the assembly is not required to operate at the higher pressures, the seal 84 can be removed, and the passage 86 sealed.

The operating assemblies described above can also be utilised to operate valve means through a rocking lever in accordance with the construction described in British published application Ser. No. 2,015,671A. In that construction the source of pressure from the boost chamber is generated by pressurisation of a trapped volume of hydraulic fluid in a cylinder.

I claim:

1. A fluid-pressure operated servo-motor assembly for a vehicle braking system comprising a housing, means defining a bore in said housing, a pedal-operated input member and an output member working in said bore, a movable wall working in said bore through which an effort is transmitted from said input member to said output member, means defining a boost chamber in said housing, a source of pressure fluid, valve means for controlling the supply of said fluid to said boost chamber for application to said movable wall to augment said effort, said valve means being located in a stationary part of said housing and being responsive to relative movement between parts of said assembly, and an operating assembly for operating said valve means located between said input and said output members, said operating assembly comprising a rotatable actuating member and a non-rotatable operating member, and a helical engagement between parts of said actuating member and said operating member such that relative movement of said actuating and operating members in an axial direction in response to said effort causes rotation of said actuating member to operate said valve means.

2. A fluid-pressure operated servo-motor assembly as claimed in claim 1, wherein said effort causes relative axial movement of said operating member and said actuating member towards each other to operate said valve means, and relative axial movement of said operating member and said actuating member away from each other returns said valve means to its initial position when said effort is relieved.

3. A fluid-pressure operated servo-motor assembly as claimed in claim 2, wherein a return spring is incorporated to cause said members to move away from each other when said effort is relieved.

4. A fluid-pressure operated servo-motor assembly as claimed in claim 1, wherein said input and output members comprise pistons working in said bore, said boost chamber being defined in said bore between said two pistons, and said operating assembly being located in said boost chamber.

5. A fluid-pressure operated servo-motor assembly as claimed in claim 1, wherein said actuating member is of cup-shaped outline and is coupled for rotation at its closed end to said output member, with said operating member movable axially with said input member and projecting into said actuating member through its open end.

6. A fluid-pressure operated servo-motor assembly as claimed in claim 1, wherein said operating member is provided on said output member which is keyed against rotation, and said actuating member comprises a rotatable sleeve movable axially with said input member and projecting into said operating member.

7. A fluid-pressure operated servo-motor assembly as claimed in claim 6, wherein said operating member is integral with said output member.

8. A fluid-pressure operated servo-motor assembly as claimed in claim 1, wherein said helical engagement comprises at least one helical groove in one of said members, and a radial projection on the other said member, said projection being received in said groove.

9. A fluid-pressure operated servo-motor assembly as claimed in claim 8, in which said helical groove is in the form of a thread having two starts displaced from each other by 180°, and one said projection is received in each said groove.

10. A fluid-pressure operated servo-motor assembly as claimed in claim 1, wherein said actuating member has a splined engagement with said valve means, said engagement being so constructed and arranged that angular movement of said actuating member causes said valve means to be operated, but axial movement of said actuating member has no effect on said valve means.

11. A fluid-pressure operated servo-motor assembly as claimed in claim 10, wherein said actuating member is provided with at least one axially extending straight external spline, which engages with corresponding teeth provided on said valve means.

12. A fluid-pressure operated servo-motor assembly as claimed in claim 1, wherein said valve means comprises a spool valve said spool valve working in a transverse bore in said housing, and being provided with at least one circumferentially extending tooth for co-operation with said actuating member.

13. A fluid-pressure operated servo-motor assembly as claimed in claim 1, wherein said valve means comprises a rotary face valve working in said bore in said housing, and said rotary face valve is provided with at least one tooth for co-operation with said actuating member.

14. A fluid-pressure operated servo-motor assembly as claimed in claim 1, wherein said boost chamber is provided with at least one inlet port for connection to said source of pressure fluid, and at least one exhaust port for connection to a reservoir for fluid, and said valve means is operative initially to close said exhaust port, and then to open said inlet port to admit fluid pressure to said boost chamber.

15. A fluid-pressure operated servo-motor assembly as claimed in claim 1, in which a chamber defined between said input and output members and sealed from said boost chamber is vented to atmosphere, the arrangement being such that the effective diameter of said input member is reduced.

16. A fluid-pressure operated servo-motor assembly as claimed in claim 15, wherein said chamber is vented through a passage in said output member.

17. A fluid-pressure operated servo-motor assembly as claimed in claim 15, wherein an additional piston mounted on the input member works in a bore formed in said output member, said additional piston sealing against said output member, and said chamber is defined between said additional piston and said output member.

18. A fluid-pressure operated servo-motor assembly for a vehicle braking system comprising a housing, means defining a bore in said housing, a pedal-operated input member and an output member working in said bore, a movable wall through which an effort is transmitted from said input member to said output member, means defining a boost chamber in said bore between said members, a source of pressure fluid, valve means for controlling the supply of said fluid to said boost chamber for application to said movable wall to augment said effort, and means defining a chamber between said input and said output members, said chamber being sealed from said boost chamber, having a cross-sectional area less than that of said input member and being vented to a pressure substantially lower than said fluid-operating pressure.

* * * * *